(12) United States Patent
Okuda et al.

(10) Patent No.: US 8,604,757 B2
(45) Date of Patent: Dec. 10, 2013

(54) DC/DC POWER CONVERSION APPARATUS

(75) Inventors: Tatsuya Okuda, Tokyo (JP); Hiroshi Ito, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 13/520,914

(22) PCT Filed: Nov. 29, 2010

(86) PCT No.: PCT/JP2010/071238
§ 371 (c)(1),
(2), (4) Date: Jul. 6, 2012

(87) PCT Pub. No.: WO2011/092932
PCT Pub. Date: Aug. 4, 2011

(65) Prior Publication Data
US 2013/0021011 A1    Jan. 24, 2013

(30) Foreign Application Priority Data
Feb. 1, 2010 (JP) .................................. 2010-019883

(51) Int. Cl.
G05F 1/613 (2006.01)
G05F 1/618 (2006.01)

(52) U.S. Cl.
USPC ........................... 323/225; 323/271; 323/288

(58) Field of Classification Search
USPC .......... 323/222, 223, 225, 268, 271, 288, 350
See application file for complete search history.

(56) References Cited

U.S. PATENT DOCUMENTS

| | | | | |
|---|---|---|---|---|
| 4,514,679 A * | 4/1985 | Schierjott | ...................... | 323/222 |
| 5,793,190 A * | 8/1998 | Sahlstrom et al. | ............ | 323/222 |
| 5,909,107 A * | 6/1999 | Aonuma et al. | ............... | 323/222 |
| 5,923,153 A * | 7/1999 | Liu | ............................... | 323/222 |
| 6,043,633 A * | 3/2000 | Lev et al. | ....................... | 323/222 |

(Continued)

FOREIGN PATENT DOCUMENTS

| | | |
|---|---|---|
| JP | 61 92162 | 5/1986 |
| JP | 9 84333 | 3/1997 |

(Continued)

OTHER PUBLICATIONS

International Search Report Issued Feb. 22, 2011 in PCT/JP10/71238 Filed Nov. 29, 2010.

(Continued)

*Primary Examiner* — Gary L Laxton
(74) *Attorney, Agent, or Firm* — Oblon, Spivak, McClelland, Maier & Neustadt, L.L.P.

(57) ABSTRACT

A DC/DC power conversion apparatus includes a reactor connected to a DC power supply and a DC voltage conversion section connected to the reactor. The DC voltage conversion section includes a plurality of switching devices, a charge-discharge capacitor which is charged or discharged by ON/OFF operations of the switching devices, a plurality of diodes which provide a charging route and a discharging route for the charge-discharge capacitor. The DC/DC power conversion apparatus also includes a smoothing capacitor on an output side, which is connected to the DC voltage conversion section and including a plurality of voltage division capacitors connected in series to each other, and a switching device for voltage equalization provided on a connection line provided between the negative terminal of the charge-discharge capacitor and a connection point between the voltage division capacitors.

15 Claims, 13 Drawing Sheets

(56) References Cited

U.S. PATENT DOCUMENTS

| | | | | |
|---|---|---|---|---|
| 6,194,882 B1* | 2/2001 | Mirow et al. | | 323/282 |
| 6,297,622 B1* | 10/2001 | Yatabe | | 323/222 |
| 7,095,630 B2* | 8/2006 | Weber | | 363/16 |
| 7,233,507 B2* | 6/2007 | Schenk | | 363/50 |
| 7,508,185 B2* | 3/2009 | Lin | | 323/351 |
| 8,106,635 B2* | 1/2012 | Watanabe et al. | | 323/223 |
| 2005/0174098 A1 | 8/2005 | Watanabe et al. | | |
| 2006/0226816 A1* | 10/2006 | Wai et al. | | 323/222 |
| 2009/0033289 A1 | 2/2009 | Xing et al. | | |
| 2012/0126764 A1 | 5/2012 | Urakabe et al. | | |

FOREIGN PATENT DOCUMENTS

| | | |
|---|---|---|
| JP | 2005 224060 | 8/2005 |
| JP | 2008 61472 | 3/2008 |
| JP | 2008 295228 | 12/2008 |

OTHER PUBLICATIONS

U.S. Appl. No. 13/811,505, filed Jan. 22, 2013, Okuda, et al.

* cited by examiner

DC/DC POWER CONVERSION APPARATUS

TECHNICAL FIELD

The present invention relates to a DC/DC power conversion apparatus that converts a DC voltage into a stepped-up or stepped-down DC voltage.

BACKGROUND ART

Conventional DC/DC power conversion apparatuses control the amount of energy to be stored in or released from a reactor by using ON/OFF operation of a semiconductor switch, thereby performing DC/DC voltage conversion. Such DC/DC power conversion apparatuses have a problem that the reactor is large and heavy. Accordingly, some techniques are proposed which reduce a voltage applied to the reactor by using charge and discharge of a capacitor and reduce an inductance value needed for the reactor, thereby reducing the size and the weight of the reactor (see, for example, Patent Literature 1).

CITATION LIST

Patent Literature

Patent Literature 1: Japanese Laid-Open Patent Publication No. 61-92162

SUMMARY OF THE INVENTION

Problems to be Solved by the Invention

A DC/DC power conversion apparatus disclosed in Patent Literature 1, in normal operation, can control the inter-terminal voltage of the charge-discharge capacitor at any level, and therefore, can substantially equalize voltages applied to switching devices and diodes composing a DC voltage conversion section.

However, in the case where ON/OFF control for the switching devices is not performed (hereinafter, such a state is referred to as a control stopped state) such as the case where the operations of the switching devices are stopped because a control power supply is not in standby condition or the case where some abnormality occurs in the DC/DC power conversion apparatus and the operations of the switching devices are stopped to prevent further breakdown due to the abnormality, if an input voltage Vin is applied to the input terminal of a DC power supply, the following problem occurs. That is, in the above cases, since the switching devices are OFF, an output voltage Vout has substantially the same potential as the input voltage Vin but the inter-terminal voltage of the charge-discharge capacitor is zero. Therefore, the full voltage is applied to the switching devices and the diodes of the DC voltage conversion section. As a result, the switching devices and the diodes of the DC voltage conversion section can be broken owing to overvoltage.

In order to prevent such trouble, the breakdown voltage of the switching devices and the diodes needs to be higher than the maximum input voltage. This causes cost increase and efficiency reduction.

The present invention has been made to solve the above problem. An object of the present invention is to make it possible to always keep the inter-terminal voltage of the charge-discharge capacitor at a desired level even if a voltage is applied to the input terminal of the DC power supply when the switching devices of the DC voltage conversion section are in control stopped states. Thus, it becomes possible to absolutely avoid device breakage even if switching devices and diodes with low breakdown voltages are used in the DC voltage conversion section, whereby a DC/DC power conversion apparatus having increased efficiency can be provided with low cost.

Solution to the Problems

A DC/DC power conversion apparatus according to the present invention comprises: a reactor connected to a DC power supply; a DC voltage conversion section connected to the reactor and composed of: a plurality of switching devices; a charge-discharge capacitor which is charged or discharged by ON/OFF operations of the switching devices; and a plurality of diodes which provide a charging route and a discharging route for the charge-discharge capacitor; a smoothing capacitor on an output side, which is connected to the DC voltage conversion section and composed of a plurality of voltage division capacitors connected in series to each other; and a switching device for voltage equalization provided on a connection line provided between the negative terminal of the charge-discharge capacitor and a connection point between the voltage division capacitors.

Another DC/DC power conversion apparatus according to the present invention comprises: a smoothing capacitor on an input side, which is connected in parallel to a DC power supply and smoothes a DC voltage, the smoothing capacitor being composed of a plurality of voltage division capacitors connected in series to each other; a reactor connected to the DC power supply; a DC voltage conversion section connected to the reactor and composed of: a plurality of switching devices; a charge-discharge capacitor which is charged or discharges by ON/OFF operations of the switching devices; and a plurality of diodes which provide a charging route and a discharging route for the charge-discharge capacitor; a smoothing capacitor on an output side, which is connected to the DC voltage conversion section; and a switching device for voltage equalization provided on a connection line provided between the negative terminal of the charge-discharge capacitor and a connection point between the voltage division capacitors of the smoothing capacitor on the input side.

Effect of the Invention

According to the DC/DC power conversion apparatus of the present invention, if a voltage is applied to the input terminal of the DC power supply when the switching devices of the DC voltage conversion section are in control stopped states, a charge current flows from the charge-discharge capacitor via the switching device for voltage equalization and some of the voltage division capacitors, whereby the inter-terminal voltage of the charge-discharge capacitor is kept at a voltage corresponding to a divided potential of each voltage division capacitor of the smoothing capacitor. Thus, voltages applied to semiconductor devices such as the switching devices or the diodes can be equalized. Therefore, it becomes possible to use semiconductor devices and capacitors with low breakdown voltages, whereby a DC/DC power conversion apparatus having increased efficiency can be provided with low cost.

DETAILED DESCRIPTION OF THE PREFERRED EMBODIMENTS OF THE INVENTION

Embodiment 1

Figure 1:
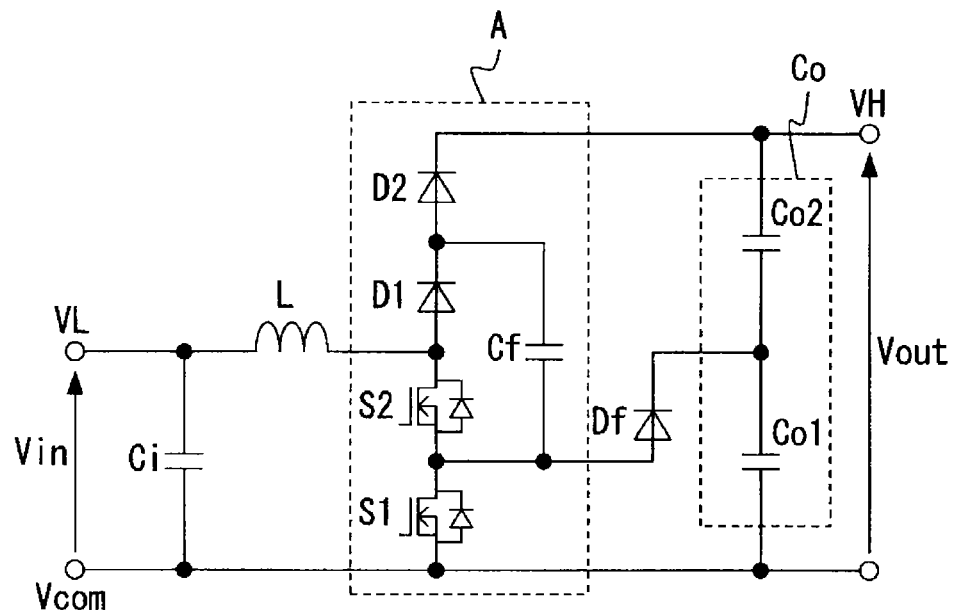
FIG. 1 is a circuit configuration diagram of a DC/DC power conversion apparatus according to embodiment 1 of the present invention.
Figure 1:
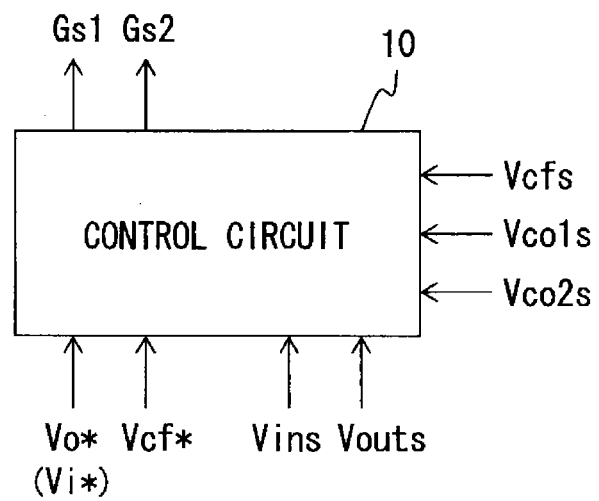

FIG. 1 is a circuit configuration diagram of a DC/DC power conversion apparatus according to embodiment 1 of the present invention.

The DC/DC power conversion apparatus of embodiment 1 steps up a DC input voltage Vin inputted between a terminal VL and a terminal Vcom from a DC power supply not shown, to a voltage equal to or higher than the input voltage Vin, and outputs an output voltage Vout which is the stepped-up voltage, between a terminal VH and the terminal Vcom. The DC/DC power conversion apparatus comprises: a smoothing capacitor Ci on the input side which smoothes the input voltage Vin; a reactor L for storing energy; a DC voltage conversion section A which steps up the input voltage Vin to the output voltage Vout; and a smoothing capacitor Co on the output side which smoothes the output voltage Vout stepped up by the DC voltage conversion section A. The DC voltage conversion section A is composed of two switching devices S1 and S2, two diodes D1 and D2, and a charge-discharge capacitor Cf. Each of the switching devices S1 and S2 is composed of a MOSFET, for example, and is turned on when a gate signal is High, here.

A feature of embodiment 1 is that the smoothing capacitor Co on the output side is composed of two voltage division capacitors Co1 and Co2 connected in series, and that the smoothing capacitor Co is provided with a diode Df as a switching device for voltage equalization.

The high-voltage-side terminal of the smoothing capacitor Ci on the input side is connected to the input terminal VL, and the low-voltage-side terminal is connected to the reference voltage terminal Vcom. Of the two voltage division capacitors Co1 and Co2 composing the smoothing capacitor Co on the output side, the low-voltage-side terminal of one voltage division capacitor Co1 is connected to the reference voltage terminal Vcom, and the high-voltage-side terminal of the other voltage division capacitor Co2 is connected to the output terminal VH. The two switching devices S1 and S2 and the two diodes D1 and D2 composing the DC voltage conversion section A are sequentially connected in series. The source terminal of the switching device S1 is connected to the reference voltage terminal Vcom, the cathode terminal of the diode D2 is connected to the output terminal VH, the connection point between the drain terminal of the switching device S2 and the anode terminal of the diode D1 is connected to the input terminal VL via the reactor L. The low-voltage-side terminal of the charge-discharge capacitor Cf is connected to the connection point between the drain terminal of the switching device S1 and the source terminal of the switching device S2, and the high-voltage-side terminal is connected to the connection point between the cathode terminal of the diode D1 and the anode terminal of the diode D2. The anode terminal of the diode Df for voltage equalization is connected to the low-voltage-side terminal of the charge-discharge capacitor Cf, and the cathode terminal is connected to the connection point between the voltage division capacitors Co1 and Co2.

A control circuit 10 performs ON/OFF control for each of the switching devices S1 and S2 of the DC voltage conversion section A. The control circuit 10 outputs gate signals Gs1 and Gs2 to the switching devices S1 and S2, respectively. An input voltage detection value Vins, an output voltage detection value Vouts, an inter-terminal voltage detection value Vcfs of the charge-discharge capacitor Cf, an inter-terminal voltage detection value Vco1s of the voltage division capacitor Co1, and an inter-terminal voltage detection value Vco2s of the voltage division capacitor Co2, are inputted to the control circuit 10. In addition, from a superior controller (not shown), an output voltage instruction value Vo* or an input voltage instruction value Vi*, and a voltage instruction value Vcf* of the charge-discharge capacitor Cf, are inputted to the control circuit 10. It is noted that the instruction values Vo*, Vi*, and Vcf* may be generated in the control circuit 10. The control circuit 10 generates and outputs the gate signals Gs1 and Gs2, based on the output voltage instruction value Vo*, the output voltage detection value Vouts, and the voltage instruction value Vcf* and voltage detection value Vcfs of the charge-discharge capacitor Cf, for example. The input voltage detection value Vins is needed for controlling the input voltage Vin, and the inter-terminal voltage detection values Vco1s and Vco2s of the voltage division capacitors Co1 and Co2 are needed for providing an overvoltage protection or the like.

Next, the operation of the DC/DC power conversion apparatus in a stationary state will be described. It is noted that the stationary state is the state in which the output voltage is stably obtained while ON/OFF control is performed for the switching devices S1 and S2.

Figure 2:
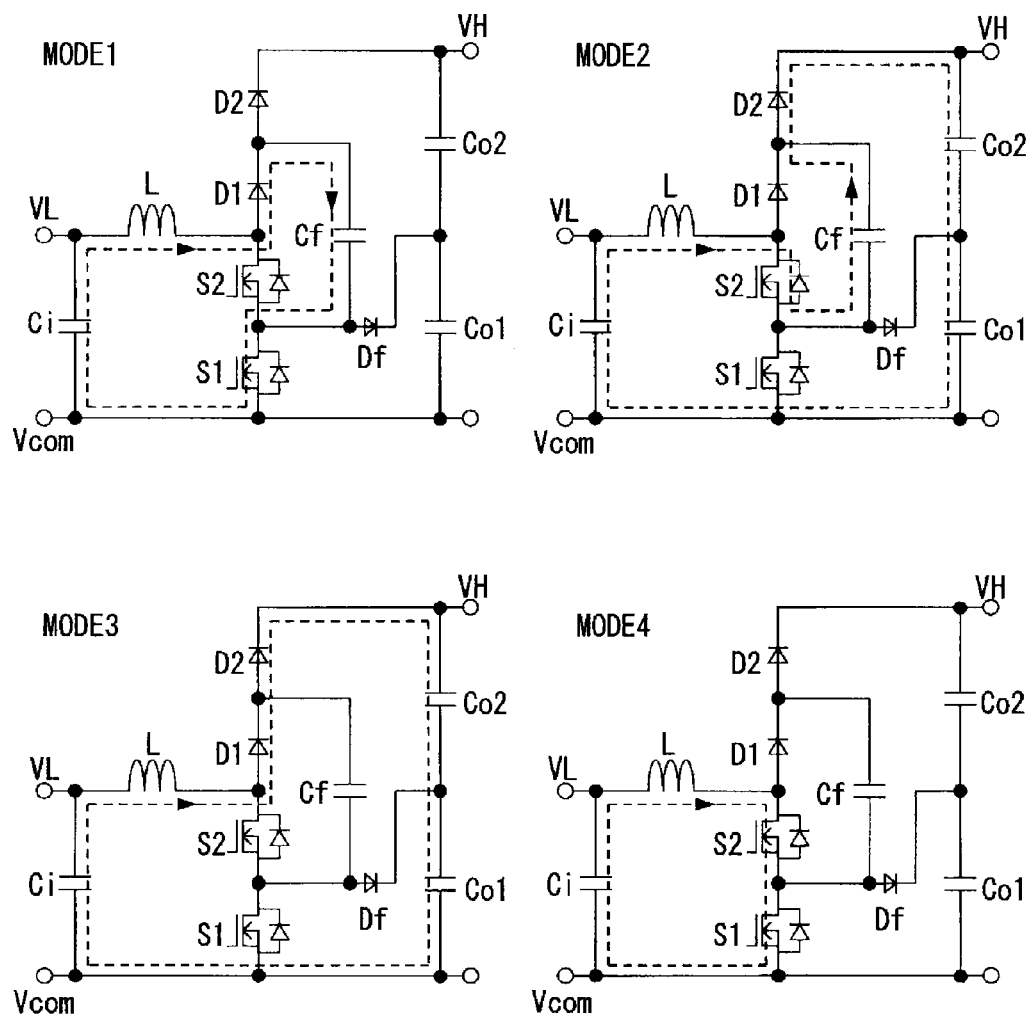
FIG. 2 is an explanation diagram showing operation modes of the DC/DC power conversion apparatus shown in FIG. 1.

As shown in FIG. 2, in the stationary state, the DC/DC power conversion apparatus has four operation modes 1 to 4. In the mode 1, the switching device S1 is turned on and the switching device S2 is turned off, whereby energy is stored in the charge-discharge capacitor Cf. In the mode 2, the switching device S1 is turned off and the switching device S2 is turned on, whereby energy in the charge-discharge capacitor Cf is released. In the mode 3, both switching devices S1 and S2 are turned off, whereby energy in the reactor L is released. In the mode 4, both switching devices S1 and S2 are turned on, whereby energy is stored in the reactor L. The period ratio among those modes is adjusted as appropriate, whereby the input voltage Vin inputted between the terminal VL and the terminal Vcom can be stepped up to any voltage to be outputted as the output voltage Vout between the terminal VH and the terminal Vcom.

In the stationary state, the operation of the DC/DC power conversion apparatus differs between when a step-up ratio N of the output voltage Vout to the input voltage Vin is equal to or smaller than 2 and when the step-up ratio N is equal to or larger than 2.

(1) First, the operation in the case where the step-up ratio N is equal to or smaller than 2 (N≤2) will be described.

Figure 3:
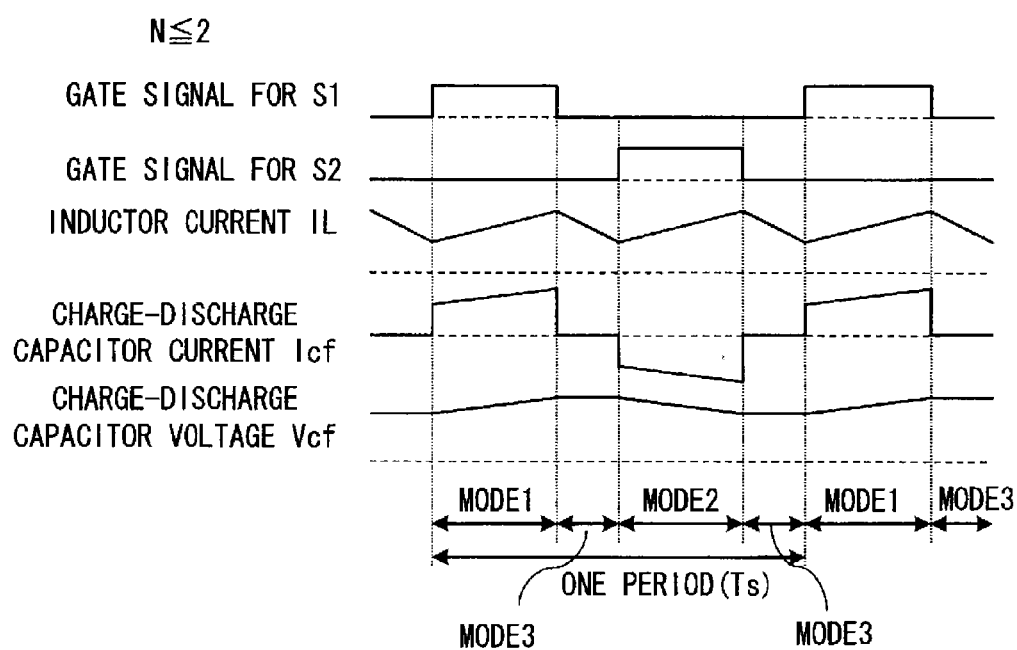
FIG. 3 is an operation explanation diagram in the case where the step-up ratio of the DC/DC power conversion apparatus shown in FIG. 1 is equal to or smaller than 2.

FIG. 3 shows gate signal voltage waveforms of the switching devices S1 and S2, a current waveform IL of the reactor L, a current waveform Icf of the charge-discharge capacitor Cf, and the inter-terminal voltage Vcf of the charge-discharge capacitor Cf, in the case where the step-up ratio N is equal to or smaller than 2. In the stationary state, the inter-terminal voltage Vcf of the charge-discharge capacitor Cf is controlled to be about the half of the output voltage Vout. The magnitude relationship among the input voltage Vin, the output voltage Vout, and the inter-terminal voltage Vcf of the charge-discharge capacitor Cf is as follows.

$$Vout > Vin > Vcf$$

When the gate signal for the switching device S1 is High and the gate signal for the switching device S2 is Low (mode 1), since the switching device S1 is ON and the switching device S2 is OFF, energy transfers from the smoothing capacitor Ci to the reactor L and the charge-discharge capacitor Cf through the following route.

Ci→L→D1→Cf→S1

Next, when the gate signal for the switching device S1 is Low and the gate signal for the switching device S2 is Low (mode 3), since the switching device S1 is OFF and the switching device S2 is OFF, energy stored in the reactor L is superimposed onto the smoothing capacitor Ci and transfers to the voltage division capacitors Co1 and Co2 through the following route.

Ci→L→D1→D2→Co2→Co1

Next, when the gate signal for the switching device S1 is Low and the gate signal for the switching device S2 is High (mode 2), since the switching device S1 is OFF and the switching device S2 is ON, energy stored in the charge-discharge capacitor Cf is superimposed onto the smoothing capacitor Ci and transfers to the voltage division capacitors Co1 and Co2 while energy is stored in the reactor L, through the following route.

Ci→L→S2→Cf→D2→Co2→Co1

Next, when the gate signal for the switching device S1 is Low and the gate signal for the switching device S2 is Low (mode 3), since the switching device S1 is OFF and the switching device S2 is OFF, energy stored in the reactor L is superimposed onto the smoothing capacitor Ci and transfers to the voltage division capacitors Co1 and Co2 through the following route.

Ci→L→D1→D2→Co2→Co1

The series of operations described above is repeated, whereby the input voltage Vin inputted between the terminal VL and the terminal Vcom is stepped up to any voltage that is one to two times as high as the input voltage Vin, and the stepped-up voltage is outputted as the output voltage Vout between the terminal VH and the terminal Vcom.

(2) Next, the operation in the case where the step-up ratio N is equal to or larger than 2 (N≥2) will be described.

Figure 4:
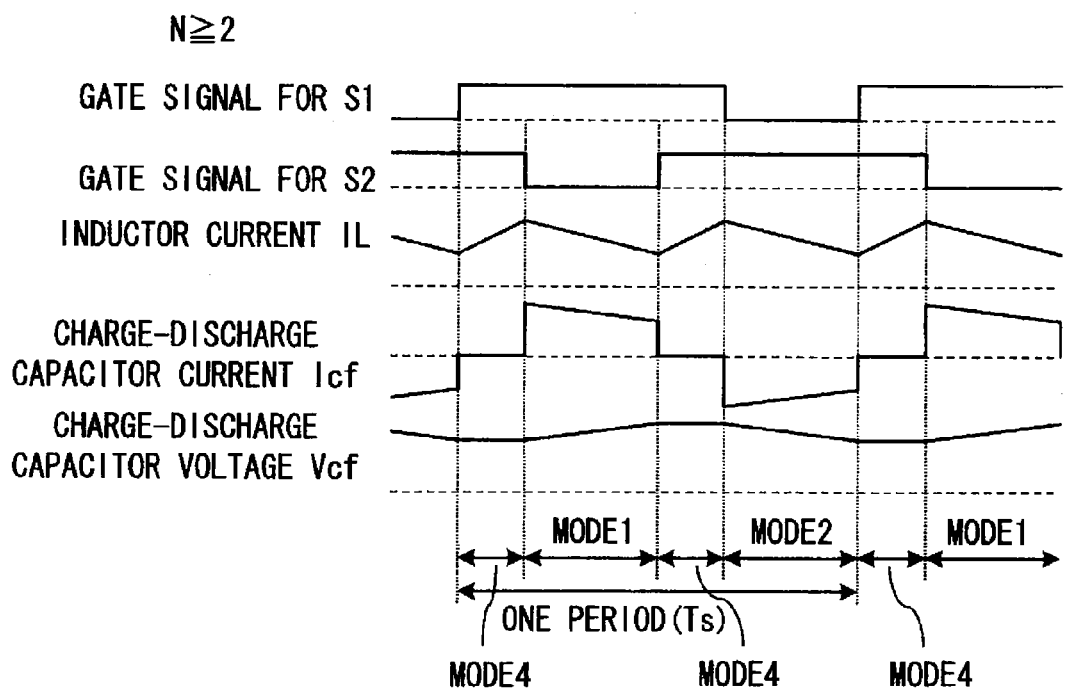
FIG. 4 is an operation explanation diagram in the case where the step-up ratio of the DC/DC power conversion apparatus shown in FIG. 1 is equal to or larger than 2.

FIG. 4 shows gate signal voltage waveforms of the switching devices S1 and S2, a current waveform IL of the reactor L, a current waveform Icf of the charge-discharge capacitor Cf, and the inter-terminal voltage Vcf of the charge-discharge capacitor Cf, in the case where the step-up ratio N is equal to or larger than 2. In the stationary state, the inter-terminal voltage Vcf of the charge-discharge capacitor Cf is controlled to be about the half of the output voltage Vout. The magnitude relationship among the input voltage Vin, the output voltage Vout, and the inter-terminal voltage Vcf of the charge-discharge capacitor Cf is as follows.

$$Vout > Vcf > Vin$$

When the gate signal for the switching device S1 is High and the gate signal for the switching device S2 is High (mode 4), since the switching device S1 is ON and the switching device S2 is ON, energy transfers from the smoothing capacitor Ci to the reactor L through the following route.

Ci→L→S2→S1

Next, when the gate signal for the switching device S1 is High and the gate signal for the switching device S2 is Low (mode 1), since the switching device S1 is ON and the switching device S2 is OFF, energy stored in the reactor L is superimposed onto the smoothing capacitor Ci and transfers to the charge-discharge capacitor Cf through the following route.

Ci→L→D1→Cf→S1

Next, when the gate signal for the switching device S1 is High and the gate signal for the switching device S2 is High (mode 4), since the switching device S1 is ON and the switching device S2 is ON, energy transfers from the smoothing capacitor Ci to the reactor L through the following route.

Ci→L→S2→S1

Next, when the gate signal for the switching device S1 is Low and the gate signal for the switching device S2 is High (mode 2), since the switching device S1 is OFF and the switching device S2 is ON, energy stored in the reactor L and the charge-discharge capacitor Cf is superimposed onto the smoothing capacitor Ci and transfers to the voltage division capacitors Co1 and Co2, through the following route.

Ci→L→S2→Cf→D2→Co2→Co1

The series of operations described above is repeated, whereby the input voltage Vin inputted between the terminal VL and the terminal Vcom is stepped up to any voltage that is equal to or higher than twice the input voltage Vin, and the stepped-up voltage is outputted as the output voltage Vout between the terminal VH and the terminal Vcom.

Figure 5:
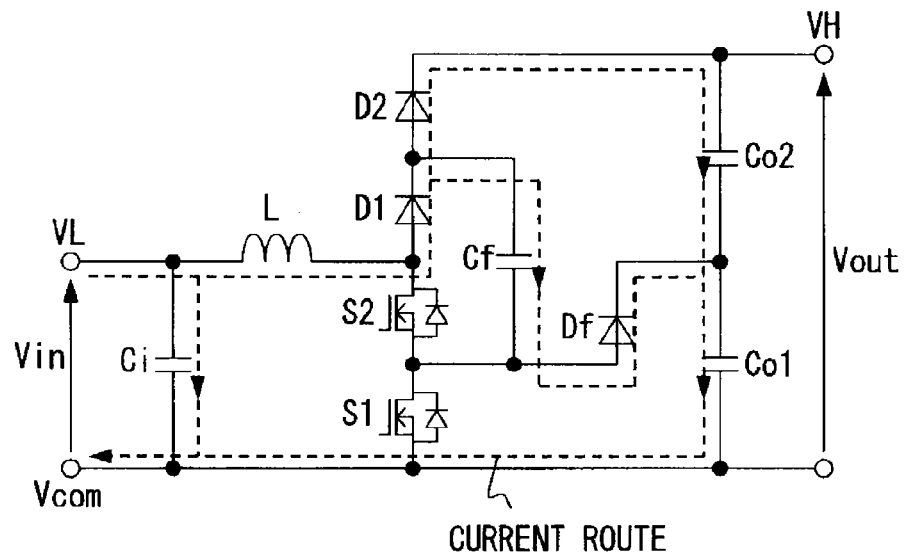
FIG. 5 is an operation explanation diagram in the case where a DC voltage is applied to an input terminal when switching devices of a DC voltage conversion section are in control stopped states in the DC/DC power conversion apparatus shown in FIG. 1.

Next, in the case where, as described above, ON/OFF control for the switching devices S1 and S2 is not performed (in the control stopped state) such as the case where the operations of the switching devices S1 and S2 are stopped because a control power supply is not in standby condition or the case where some abnormality occurs in the DC/DC power conversion apparatus and the operations of the switching devices S1 and S2 are stopped to prevent further influence due to the abnormality, if the input voltage Vin is applied between the terminal VL and the terminal Vcom, the DC/DC power conversion apparatus operates as described below with reference to FIG. 5.

As shown in FIG. 5, when both switching devices S1 and S2 are in control stopped states, since both switching devices S1 and S2 are OFF, currents flow through the following three routes, whereby the capacitors Cf, Co1, and Co2 are charged.

VL→Ci→Vcom
VL→L→D1→D2→Co2→Co1→Vcom
VL→L→D1→Cf→Df→Co1→Vcom

Thus, the input voltage Vin is applied to the smoothing capacitor Ci, and also to a connection unit composed of the charge-discharge capacitor Cf and the voltage division capacitor Co2 connected in parallel to each other, and the voltage division capacitor Co1 connected in series to the connection unit. As a result, the inter-terminal voltage Vcf of the charge-discharge capacitor Cf is represented as follows.

$$Vcf = \{Co2/(Cf+Co1+Co2)\} \times Vin$$

In the above expression, Cf, Co1, and Co2 represent the capacitances of the charge-discharge capacitor Cf, the voltage division capacitor Co1, and the voltage division capacitor Co2, respectively.

Then, if Cf<<Co1=Co2 is assumed, the inter-terminal voltage Vcf of the charge-discharge capacitor Cf is represented as follows.

$$Vcf \approx Vin/2$$

Here, a voltage Vds2 applied between the drain and the source of one switching device S2 is equal to the inter-terminal voltage Vcf of the charge-discharge capacitor Cf. Therefore, the voltage Vds2 is Vin/2 as shown in the above expression. Meanwhile, a voltage Vds1 applied between the drain and the source of the other switching device S1 is equal to a value obtained by subtracting the inter-terminal voltage Vcf of the charge-discharge capacitor Cf from the VH-Vcom inter-terminal voltage Vout. Therefore, the voltage Vds1 is represented as follows.

$$Vds1 = Vout - Vcf = Vin - Vin/2 = Vin/2$$

Thus, even if the input voltage Vin is applied between the terminal VL and the terminal Vcom when both switching devices S1 and S2 are OFF in control stopped states, unbalance between the inter-terminal voltages Vco2 and Vco1 of the voltage division capacitors Co2 and Co1 can be eliminated by the diode Df for voltage equalization being provided. Then, the voltages applied between the drains and the sources of the switching devices S1 and S2 are both equalized to be Vin/2. Therefore, it becomes possible to use semiconductor devices and capacitors with low breakdown voltages, whereby a DC/DC power conversion apparatus having increased efficiency can be provided with low cost.

In the above description, when the DC/DC power conversion apparatus is in the stationary state as shown in FIG. 2, the inter-terminal voltage Vcf of the charge-discharge capacitor Cf is controlled to be about the half of the output voltage Vout. Here, if the inter-terminal voltage Vcf of the charge-discharge capacitor Cf is controlled to be slightly higher than the half of the output voltage Vout, the DC/DC power conversion apparatus can operate more stably. Hereinafter, the reason will be described.

In the mode 2 in which the switching device S1 is OFF and the switching device S2 is ON, if the inter-terminal voltage Vcf of the charge-discharge capacitor Cf is higher than the inter-terminal voltage Vco2 of one voltage division capacitor Co2, a current flows through the following route as described above.

Ci→L→S2→Cf→D2→Co2→Co1

However, if the inter-terminal voltage Vcf of the charge-discharge capacitor Cf is lower than the inter-terminal voltage Vco2 of the voltage division capacitor Co2, since the diode D2 is reverse biased, a current flows through the following route.

Ci→L→S2→Df→Co1

If a current continuously flows through the above route, since the electric charge of the other voltage division capacitor Co1 becomes larger than that of the one voltage division capacitor Co2, voltage unbalance occurs between the voltage division capacitors Co1 and Co2, and at worst, the other voltage division capacitor Co1 can be broken owing to overvoltage.

Also, in the mode 3 in which the switching device S1 is OFF and the switching device S2 is OFF, if the inter-terminal voltage Vcf of the charge-discharge capacitor Cf is lower than the inter-terminal voltage Vco2 of one voltage division capacitor Co2, since the diode D2 is reverse biased, a current flows through the following route.

Ci→L→D1→Cf→Df→Co1

If a current continuously flows through the above route, since the electric charge of the other voltage division capacitor Co1 becomes larger than that of the one voltage division capacitor Co2, voltage unbalance occurs between the voltage division capacitors Co1 and Co2, and at worst, the other voltage division capacitor Co1 can be broken owing to overvoltage.

In order to prevent such an unstable operation, the inter-terminal voltage Vcf of the charge-discharge capacitor Cf is maintained to be equal to or higher than the inter-terminal voltage Vco2 of the one voltage division capacitor Co2. Specifically, a minimum value Vcf(min) of the inter-terminal voltage of the charge-discharge capacitor Cf in the case where a ripple voltage is taken into consideration is controlled to be equal to or larger than a maximum value Vco2(max) of the inter-terminal voltage of the one voltage division capacitor Co2. That is, the following expression is satisfied.

$$Vcf(\min) \geq Vco2(\max)$$

Thus, it becomes possible to eliminate such an unstable operation in which voltage unbalance occurs between the voltage division capacitors Co1 and Co2 as described above.

Figure 6:
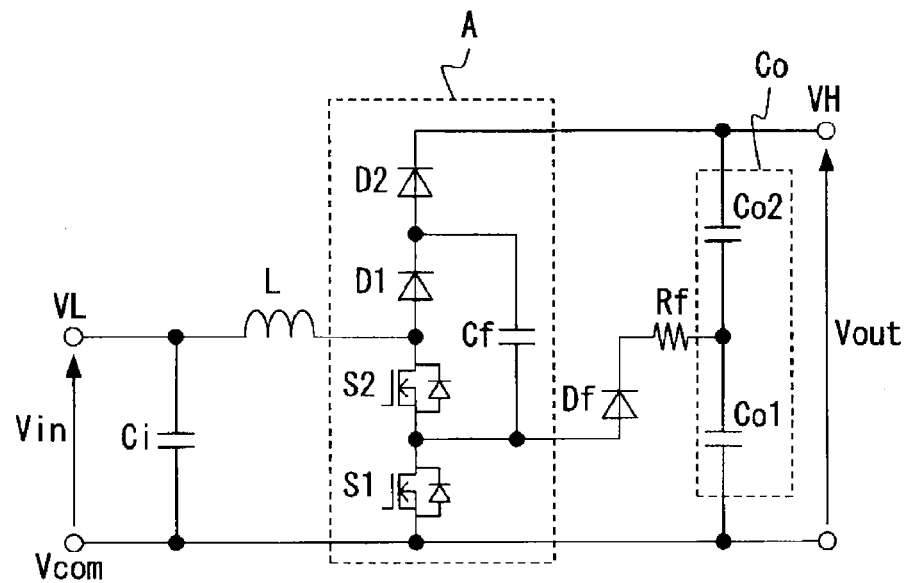
FIG. 6 is a circuit configuration diagram showing a modification of the DC/DC power conversion apparatus according to embodiment 1 of the present invention.

In embodiment 1, the diode Df for voltage equalization is provided between the negative terminal of the charge-discharge capacitor Cf and the connection point between the voltage division capacitors Co1 and Co2. However, as shown in FIG. 6, in addition to the diode Df, a current limiting resistor Rf may be connected in series. In this configuration, when the inter-terminal voltage Vcf of the charge-discharge capacitor Cf is equal to or lower than the inter-terminal voltage Vco2 of the one voltage division capacitor Co2, a current flowing in the diode Df for voltage equalization is reduced by the current limiting resistor Rf. Thus, voltage unbalance occurring between the voltage division capacitors Co1 and Co2 can be further suppressed.

In embodiment 1, the diode Df is provided between the negative terminal of the charge-discharge capacitor Cf and the connection point between the voltage division capacitors Co1 and Co2. However, instead of the diode Df, a so-called normally-on type relay may be provided which turns on when the switching devices S1 and S2 are in control stopped states and turns off when the switching devices S1 and S2 perform switching operations in the stationary state. Also in this case, the same effect can be provided.

Thus, according to embodiment 1, even if the input voltage Vin is applied between the terminal VL and the terminal Vcom when the switching devices S1 and S2 are in control stopped states, voltages applied between the drains and the sources of the switching devices S1 and S2 can be equalized. Therefore, it becomes possible to use semiconductor devices and capacitors with low breakdown voltages, whereby a DC/DC power conversion apparatus having increased efficiency can be provided with low cost.

Here, if the inter-terminal voltage Vcf of the charge-discharge capacitor Cf is controlled to be slightly higher than the inter-terminal voltage Vco2 of the one voltage division capacitor Co2, it becomes possible to ensure that voltage unbalance between the voltage division capacitors Co1 and Co2 connected in series to each other is prevented, whereby a highly reliable DC/DC power conversion apparatus that can operate stably can be provided.

Embodiment 2

Figure 7:
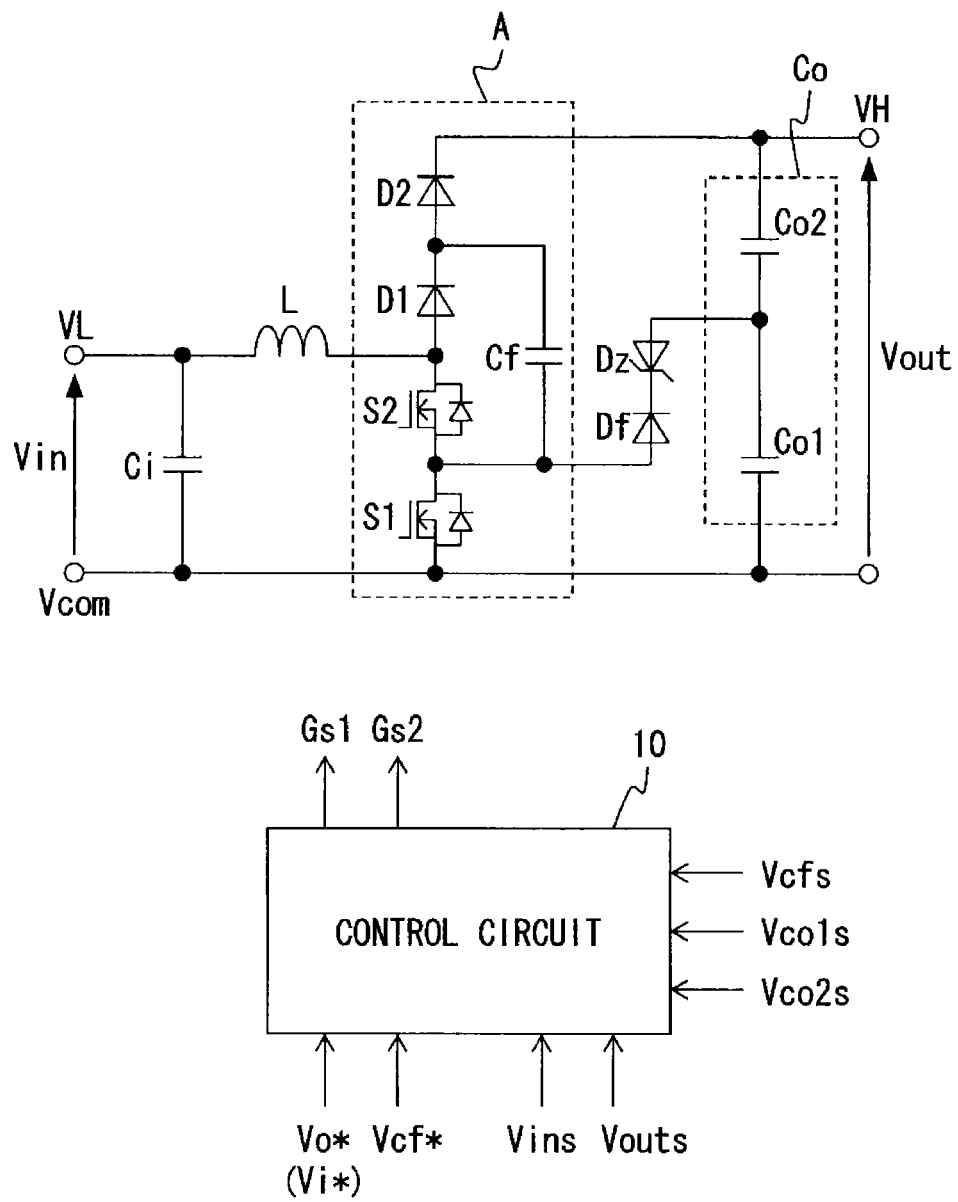
FIG. 7 is a circuit configuration diagram of a DC/DC power conversion apparatus according to embodiment 2 of the present invention.

FIG. 7 is a circuit configuration diagram of a DC/DC power conversion apparatus according to embodiment 2 of the present invention. In FIG. 7, components that correspond to or are the same as those of embodiment 1 shown in FIG. 1 are denoted by the same reference numerals and characters.

The difference from the DC/DC power conversion apparatus of embodiment 1 is that a zener diode Dz is provided between the diode Df for voltage equalization and the connection point between the voltage division capacitors Co1 and Co2 composing the smoothing capacitor Co on the output side.

The other configuration and the basic operation of the DC/DC power conversion apparatus are the same as in embodiment 1. Here, the significance of the addition of the zener diode Dz will be described in detail.

In embodiment 1, the inter-terminal voltage Vcf of the charge-discharge capacitor Cf is controlled to be slightly higher than the half of the output voltage Vout, so that the DC/DC power conversion apparatus can operate more stably in the stationary state. However, if the inter-terminal voltage Vcf of the charge-discharge capacitor Cf is extremely higher than the half of the output voltage Vout, a ripple current in the reactor L increases. As a result, a problem such as increase in reactor loss or reactor noise occurs.

Figure 8:
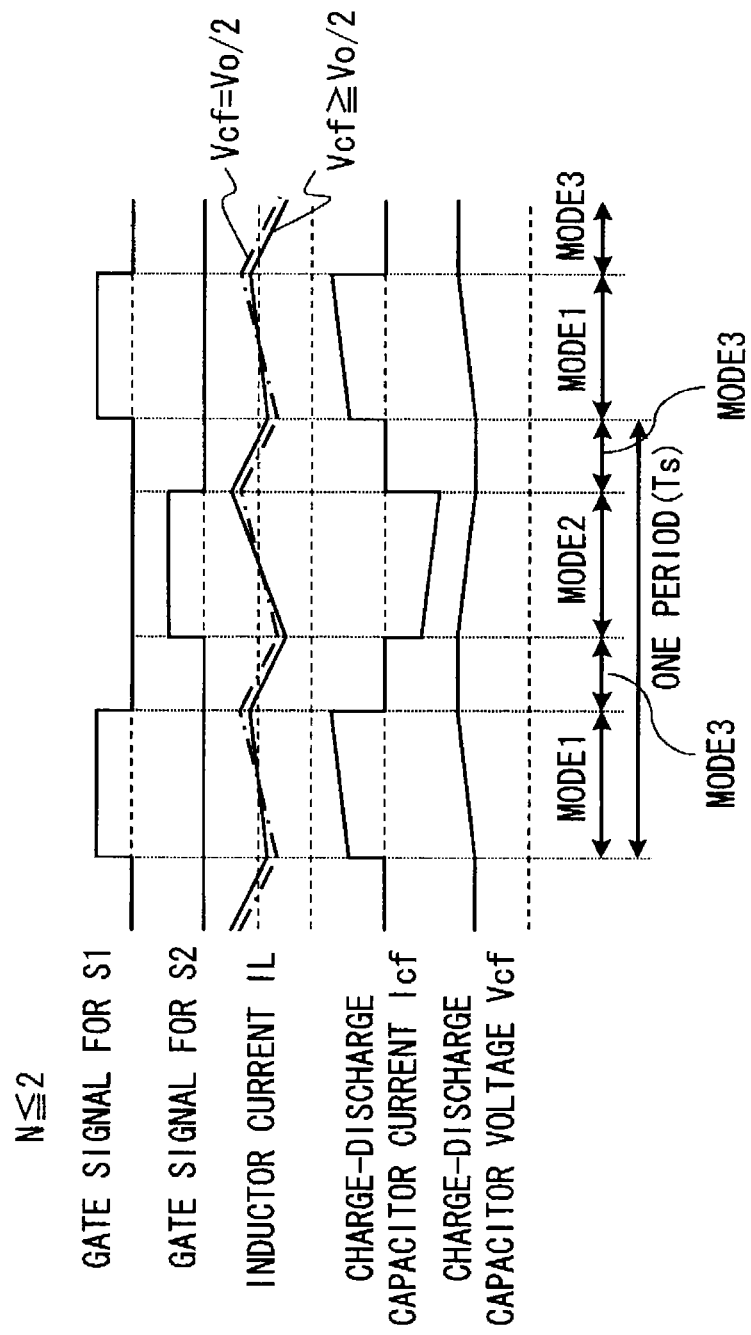
FIG. 8 is an operation explanation diagram of the DC/DC power conversion apparatus shown in FIG. 7.

FIG. 8 shows the relationship among gate signal voltage waveforms of the switching devices S1 and S2, the current waveform IL of the reactor L, the current waveform Icf of the charge-discharge capacitor Cf, and the inter-terminal voltage Vcf of the charge-discharge capacitor Cf, in the stationary state, when the step-up ratio N is equal to or smaller than 2, as an example.

In FIG. 8, the waveform of the reactor current IL indicated by the dashed-dotted line is the waveform as it is when the charge-discharge capacitor voltage Vcf is equal to the half of the output voltage Vout, and the waveform of the reactor current IL indicated by the solid line is the waveform as it is when the charge-discharge capacitor voltage Vcf is higher than the half of the output voltage Vout.

In the stationary state, when the inter-terminal voltage Vcf of the charge-discharge capacitor Cf is higher than the half of the output voltage Vout, the voltage applied to the reactor in the mode 1 and the voltage applied to the reactor in the mode 2 are different from each other. Therefore, the change rate of the reactor current differs between the modes 1 and 2. As a result, the ripple current in the reactor L includes a frequency component twice as high as the switching frequency (1/Ts) and a frequency component equal to the switching frequency.

If a ripple current having a low-frequency component flows in the reactor L as described above, reactor loss or reactor noise increases. In order to reduce such a low-frequency component of the ripple current, it is desirable that the inter-terminal voltage Vcf of the charge-discharge capacitor Cf is set to be close to the half of the output voltage Vout. However, if the inter-terminal voltage Vcf of the charge-discharge capacitor Cf is extremely close to the half of the output voltage Vout, voltage unbalance occurs between the voltage division capacitors Co1 and Co2 as described above, resulting in some trouble such as overvoltage breakage of the voltage division capacitor Co1 at worst.

Considering the above, in embodiment 2, the zener diode Dz is provided between the diode Df and the connection point between the voltage division capacitors Co1 and Co2. Owing to this configuration, when the switching devices are in control stopped states, occurrence of voltage unbalance between the voltage division capacitors Co1 and Co2 is suppressed so that the stable operation of the DC/DC power conversion apparatus is ensured, and at the same time, in the stationary state, a low-frequency component of the ripple current flowing in the reactor L is reduced. Hereinafter, operations and effects in the case where the zener diode Dz is provided will be described.

First, the case where the input voltage Vin is applied between the terminal VL and the terminal Vcom when both switching devices S1 and S2 are in control stopped states, will be described.

When the switching devices S1 and S2 are in control stopped states, both switching devices S1 and S2 are OFF. At this time, if the input voltage Vin is applied between the terminal VL and the terminal Vcom, the zener diode Dz becomes conductive and currents flow through the following three routes, whereby the capacitors Cf, Co2, and Co1 are charged.

VL→Ci→Vcom

VL→L→D1→D2→Co2→Co1→Vcom

VL→L→D1→Cf→Df→Dz→Co1→Vcom

Thus, the input voltage Vin is applied to the smoothing capacitor Ci on the input side, and also to a connection unit composed of the charge-discharge capacitor Cf and the voltage division capacitor Co2 connected in parallel to each other via the zener diode Dz, and the voltage division capacitor Co1 connected in series to the connection unit. As a result, the inter-terminal voltage Vcf of the charge-discharge capacitor Cf is represented as follows.

$$Vcf=\{Co1/(Cf+Co1+Co2)\}\times(Vin-2\times Vzd)$$

Here, if Cf<<Co1=Co2 is assumed, the inter-terminal voltage Vcf of the charge-discharge capacitor Cf is represented as follows.

$$Vcf\approx Vin/2-Vzd$$

In the above expressions, Vzd represents the inter-terminal voltage of the zener diode Dz, and Cf, Co1, and Co2 represent the capacitances of the charge-discharge capacitor Cf, the voltage division capacitor Co1, and the voltage division capacitor Co2, respectively.

The voltage Vds2 applied between the drain and the source of one switching device S2 is equal to the inter-terminal voltage Vcf of the charge-discharge capacitor Cf. Therefore, the voltage Vds2 is (Vin/2−Vzd). Meanwhile, the voltage Vds1 applied between the drain and the source of the other switching device S1 is equal to a value obtained by subtracting the inter-terminal voltage of the charge-discharge capacitor Cf from the VH-Vcom inter-terminal voltage. Therefore, the voltage Vds1 is represented as follows.

$$Vds1=Vout-Vcf=Vin/2+Vzd$$

Thus, owing to the zener diode Dz provided between the diode Df and the connection point between the voltage division capacitors Co1 and Co2, if the input voltage Vin is applied between the terminal VL and the terminal Vcom when both switching devices S1 and S2 are OFF in control stopped states, the voltages applied between the drains and the sources of the switching devices S1 and S2 can be substantially equalized by the zener diode Dz becoming conductive. Therefore, it becomes possible to use semiconductor devices and capacitors with low breakdown voltages, whereby a DC/DC power conversion apparatus having increased efficiency can be provided with low cost.

Next, the operation in the stationary state in which the output voltage is stably obtained while ON/OFF control is performed for the switching devices S1 and S2, will be described.

First, in the stationary state, in the mode 2 in which the switching device S1 is OFF and the switching device S2 is ON, the current route differs depending on the magnitude relationship between the sum of the inter-terminal voltage Vcf of the charge-discharge capacitor Cf and the breakdown voltage Vzd of the zener diode Dz, and the inter-terminal voltage Vco2 of one voltage division capacitor Co2.

In order to prevent occurrence of voltage unbalance between the voltage division capacitors Co1 and Co2, the zener diode Dz is made non-conduction state. That is, the sum of the inter-terminal voltage Vcf of the charge-discharge capacitor Cf and the breakdown voltage Vzd of the zener diode Dz is set to be larger than the inter-terminal voltage Vco2 of the one voltage division capacitor Co2. That is, Vcf+Vzd≥Vco2 is satisfied. In this case, a current flows through the following route.

Ci→L→S2→Cf→D2→Co2→Co1

Also, in the stationary state, in the mode 3 in which the switching device S1 is OFF and the switching device S2 is OFF, the current route differs depending on the magnitude relationship between the sum of the inter-terminal voltage Vcf of the charge-discharge capacitor Cf and the breakdown voltage Vzd of the zener diode Dz, and the inter-terminal voltage Vco2 of the smoothing capacitor Co2.

In order to prevent occurrence of voltage unbalance between the voltage division capacitors Co1 and Co2, the zener diode Dz is made non-conduction state. That is, the sum of the inter-terminal voltage Vcf of the charge-discharge capacitor Cf and the breakdown voltage Vzd of the zener diode Dz is set to be larger than the inter-terminal voltage Vco2 of the voltage division capacitor Co2. That is, Vcf+Vzd≥Vco2 is satisfied. In this case, a current flows through the following route.

Ci→L→D1→D2→Co2→Co1

Therefore, in the stationary state, in order to prevent an unstable operation in the modes 2 and 3, the breakdown voltage Vzd of the zener diode Dz is set so as to satisfy the following expression.

$Vzd \geq Vco2(max) - Vcf(min)$

Here, Vcf(min) is the minimum value of the inter-terminal voltage of the charge-discharge capacitor Cf in the case where a ripple voltage is taken into consideration, and Vco2(max) is the maximum value of the inter-terminal voltage of the smoothing capacitor Co2.

Thus, according to embodiment 2, the zener diode Dz is provided between the diode Df and the connection point between the voltage division capacitors Co1 and Co2. When the switching devices S1 and S2 are in control stopped states, if the input voltage Vin is applied between the terminal VL and the terminal Vcom, the zener diode Dz is turned on, whereby occurrence of voltage unbalance between the voltage division capacitors Co1 and Co2 is prevented and the voltages applied between the drains and the sources of the switching devices S1 and S2 are substantially equalized. Meanwhile, the breakdown voltage Vzd of the zener diode Dz is appropriately set so as to turn off the zener diode Dz in the stationary state, whereby a low-frequency component of the ripple current flowing in the reactor L is reduced. Thus, in embodiment 2, suppression of occurrence of voltage unbalance between the voltage division capacitors Co1 and Co2, and reduction of a low-frequency component of the ripple current flowing in the reactor L, can be both realized. Therefore, a highly reliable DC/DC power conversion apparatus that can operate stably with small loss and small noise can be provided.

In embodiment 2, the zener diode Dz is provided between the diode Df and the connection point between the voltage division capacitors Co1 and Co2. However, as described above with reference to FIG. 7, a current limiting resistor may be further connected in series to the zener diode Dz, whereby the same effect can be provided.

Embodiment 3

Figure 9:
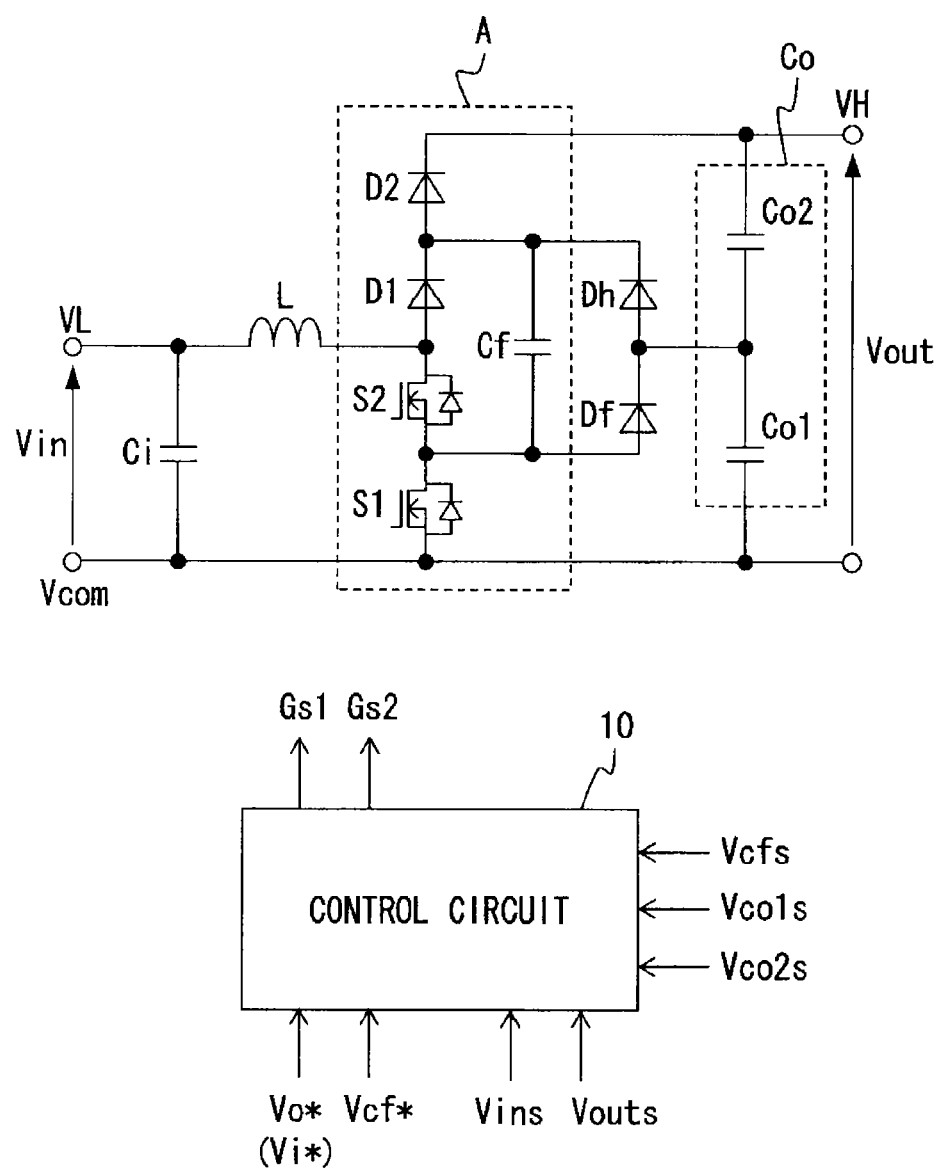
FIG. 9 is a circuit configuration diagram of a DC/DC power conversion apparatus according to embodiment 3 of the present invention.

FIG. 9 is a circuit configuration diagram of a DC/DC power conversion apparatus according to embodiment 3 of the present invention. In FIG. 9, components that correspond to or are the same as those of embodiment 1 shown in FIG. 1 are denoted by the same reference numerals and characters.

Besides a load that unilaterally consumes power, a load that causes regenerative power can be connected to the DC/DC power conversion apparatus. In the case where such a load that causes regenerative power is connected to the output side of the DC/DC power conversion apparatus, when the output voltage Vout has increased owing to the regenerative power, the whole increased voltage of the output voltage Vout is applied to the switching devices and the diodes of the DC voltage conversion section A. In this case, the switching devices and the diodes of the DC voltage conversion section A can be broken owing to overvoltage.

Considering the above, in embodiment 3, a diode Dh for returning current is further provided between the positive terminal of the charge-discharge capacitor Cf and the cathode terminal of the diode Df for voltage equalization in the apparatus configuration of embodiment 1 shown in FIG. 1.

Figure 10:
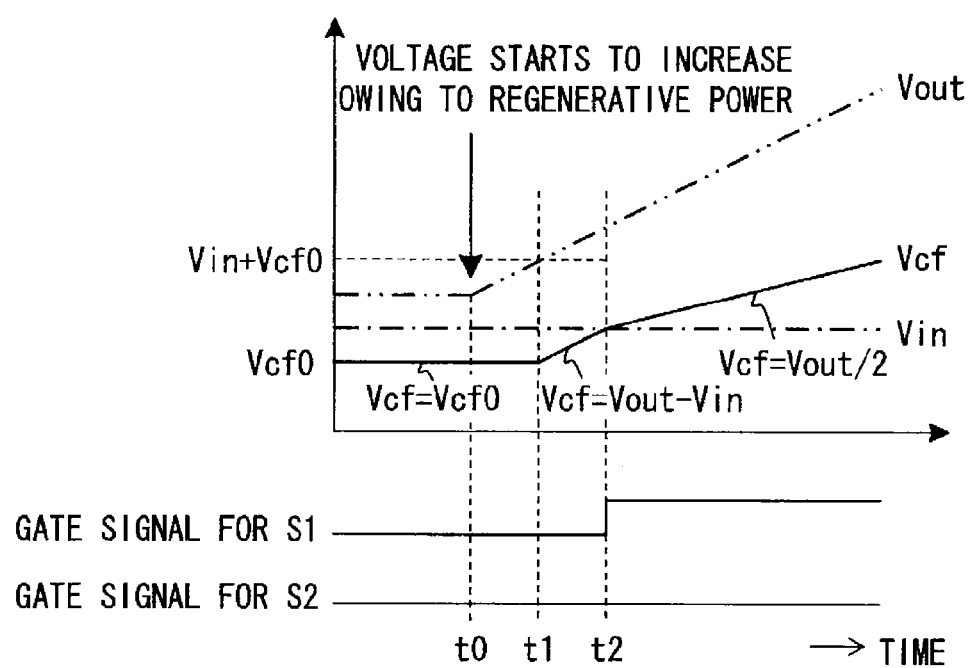
FIG. 10 is an operation explanation diagram of the DC/DC power conversion apparatus shown in FIG. 9.

The basic operations of the DC/DC power conversion apparatus in the stationary state and the control stopped state are the same as in embodiment 1. Here, in the case where the output voltage Vout is increased by regenerative power, operations and effects obtained by the diode Dh for returning current being provided will be described with reference to FIG. 10.

As an initial state, it will be assumed that the step-up ratio N is equal to or smaller than 2, the inter-terminal voltage of the charge-discharge capacitor Cf is Vcf0, the capacitance of each capacitor satisfies Co1=Co2>>Cf, and both switching devices S1 and S2 are OFF.

In the initial state, when the output voltage Vout satisfies Vout≤Vin+Vcf0, a current flows through the following route.

VH→Co2→Co1→Vcom

While the output voltage Vout gradually increases owing to regenerative power from time t0, when the output voltage Vout satisfies Vout≥Vin+Vcf0 at time t1, a current also flows through the following route, as well as the above route.

VH→Co2→Dh→Cf→S2→L→Ci→Vcom

At this time, the inter-terminal voltage Vcf of the charge-discharge capacitor Cf is represented as Vcf=Vout−Vin.

While the output voltage Vout further increases owing to regenerative power, when Vcf≥Vin is satisfied (the step-up ratio N is equal to or larger than 2) at time t2, the gate signal for the switching device S1 is set to be High to turn on the switching device S1. In this state, since the diode D1 is reverse biased, currents flow through the following two routes without flowing in the diode D1 or the reactor L.

VH→Co2→Co1→Vcom
VH→Co2→Dh→Cf→S1→Vcom

As a result, the output voltage Vout is applied to a connection unit composed of the charge-discharge capacitor Cf and the voltage division capacitor Co2 connected in parallel to each other, and the voltage division capacitor Co1 connected in series to the connection unit. Therefore, the inter-terminal voltage Vcf of the charge-discharge capacitor Cf is represented as Vcf=Vout/2. Thus, it becomes possible to substantially equalize the voltages applied to the switching devices S1 and S2 and the diodes D1 and D2.

Thus, embodiment 3 is applicable also to the case where a load that causes regenerative power is connected to the output side of the DC/DC power conversion apparatus and the output voltage Vout is increased owing to the regenerative power. That is, in embodiment 3, the diode Dh for returning current is provided, whereby the inter-terminal voltage Vcf of the charge-discharge capacitor Cf becomes a voltage corresponding to the divided potentials of the voltage division capacitors Co1 and Co2. Therefore, the voltages applied to the switching devices S1 and S2 and the diodes D1 and D2 can be substantially equalized. Therefore, it becomes possible to use semiconductor devices and capacitors with low breakdown voltages, whereby a DC/DC power conversion apparatus having increased efficiency can be provided with low cost.

In embodiment 3, the diode Dh for returning current is further provided between the positive terminal of the charge-discharge capacitor Cf and the cathode terminal of the diode Df for voltage equalization. However, as described above with reference to FIG. 6, a current limiting resistor may be further provided between the connection point between the diodes Df and Dh and the connection point between the voltage division capacitors Co1 and Co2, whereby the same effect can be provided.

In addition, in embodiment 3, since the two diodes Df and Dh are connected to the charge-discharge capacitor Cf of the DC voltage conversion section A, the following advantage is provided. That is, when the switching devices S1 and S2 are in switching operation stopped states, not only in the case where the input voltage Vin is applied between the terminal VL and the terminal Vcom but also in the case where the output voltage Vout is increased owing to regenerative power from a load, the voltages applied to the switching devices S1 and S2 and the diodes D1 and D2 can be substantially equalized, whereby device breakage can be prevented.

However, if it is merely desired that the voltages applied to the switching devices S1 and S2 and the diodes D1 and D2 are substantially equalized when the output voltage Vout is increased owing to regenerative power, this can be achieved without one diode Df for voltage equalization, that is, only the diode Dh for returning current may be provided between the positive terminal of the charge-discharge capacitor Cf and the connection point between voltage division capacitors Co1 and Co2.

Embodiment 4

Figure 11:
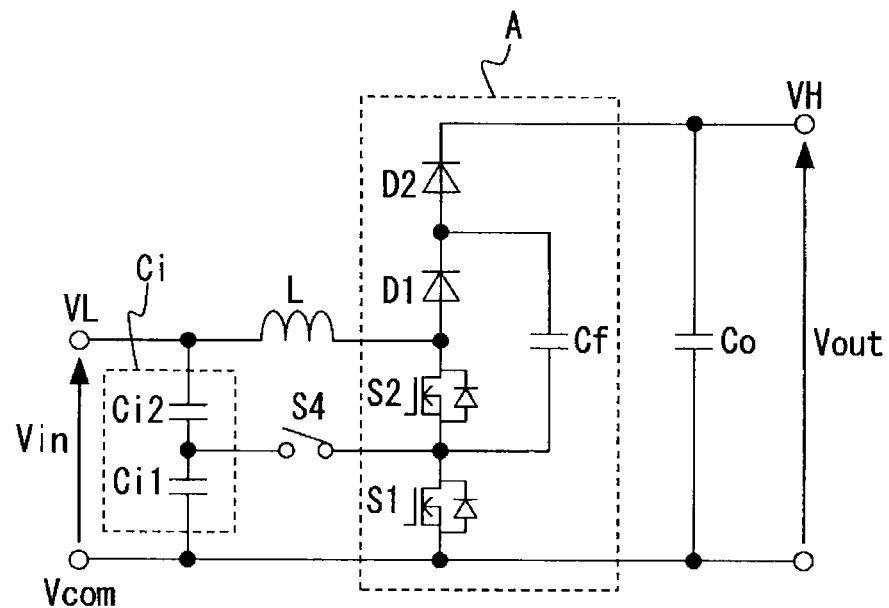
FIG. 11 is a circuit configuration diagram of a DC/DC power conversion apparatus according to embodiment 4 of the present invention.
Figure 11:
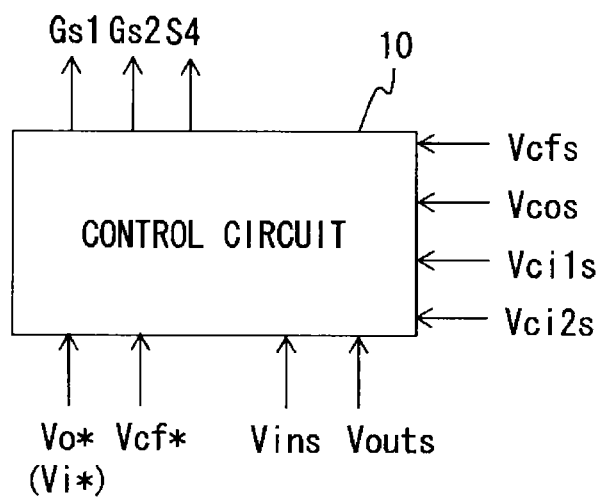

FIG. 11 is a circuit configuration diagram of a DC/DC power conversion apparatus according to embodiment 4 of the present invention. In FIG. 11, components that correspond to or are the same as those of embodiment 1 shown in FIG. 1 are denoted by the same reference numerals and characters.

A feature of the DC/DC power conversion apparatus of embodiment 4 is as follows. Although the smoothing capacitor Co on the output side is composed of a single capacitor, the smoothing capacitor Ci on the input side is composed of two voltage division capacitors Ci1 and Ci2 connected in series, and is provided with a relay S4 as a switching device for voltage equalization.

The relay S4 for voltage equalization is a so-called normally-on type relay which turns on when the switching devices S1 and S2 are in control stopped states and turns off when the switching devices S1 and S2 perform switching operations in the stationary state. One terminal of the relay S4 is connected to the low-voltage-side terminal of the charge-discharge capacitor Cf of the DC voltage conversion section A, and the other terminal is connected to the connection point between the voltage division capacitors Ci1 and Ci2. The input voltage detection value Vins, the output voltage detection value Vouts, the inter-terminal voltage detection value Vcfs of the charge-discharge capacitor Cf, inter-terminal voltage detection values Vci1s and Vci2s of the voltage division capacitors Ci1 and Ci2, and an inter-terminal voltage detection value Vcos of the smoothing capacitor Co, are inputted to the control circuit 10. In addition, as in embodiment 1, from the superior controller (not shown), the output voltage instruction value Vo* or the input voltage instruction value Vi*, and the voltage instruction value Vcf* of the charge-discharge capacitor Cf, are inputted to the control circuit 10. The control circuit 10 outputs the gate signals Gs1 and Gs2 to the switching devices S1 and S2 of the DC voltage conversion section A, respectively, and outputs an ON/OFF signal to the relay S4.

The other configuration is the same as that of embodiment 1 shown in FIG. 1, and therefore the detailed description thereof is omitted here.

Here, in the stationary state in which the output voltage Vout obtained by stepping up the input voltage Vin inputted between the terminal VL and the terminal Vcom is outputted between the terminal VH and the terminal Vcom, a holding signal for holding the OFF state of the relay S4 is inputted. When the relay S4 is OFF, the basic step-up operation in the stationary state is the same as in embodiments 1 to 3.

On the other hand, when the switching devices S1 and S2 are in control stopped state, if the input voltage Vin is applied between the terminal VL and the terminal Vcom, input of the holding signal is stopped so that the relay S4 turns on. At this time, since both switching devices S1 and S2 are OFF, currents flow through the following three routes, whereby the capacitors Cf, Ci1, Ci2, and Co are charged.

VL→Ci2→Ci1→Vcom
VL→L→D1→D2→Co→Vcom
VL→L→D1→Cf→S4→Ci1→Vcom

Thus, the input voltage Vin is applied to the smoothing capacitor Co on the output side, and also to a connection unit composed of the charge-discharge capacitor Cf and the voltage division capacitor Ci2 connected in parallel to each other, and the voltage division capacitor Ci1 connected in series to the connection unit. As a result, the inter-terminal voltage Vcf of the charge-discharge capacitor Cf is represented as follows.

$$Vcf=\{Ci2/(Cf+Ci1+Ci2)\} \times Vin$$

Here, if Cf<<Ci1=Ci2 is assumed, since both switching devices S1 and S2 are OFF, the inter-terminal voltage Vcf of the charge-discharge capacitor Cf is represented as follows.

$$Vcf \approx Vin/2 = Vout/2$$

Thus, since the inter-terminal voltage Vcf of the charge-discharge capacitor Cf is represented as Vcf=Vout/2, it becomes possible to substantially equalize the voltages applied to the switching devices S1 and S2 and the diodes D1 and D2.

As described above, also in embodiment 4, as in embodiment 1, in the case where the input voltage Vin is applied between the terminal VL and the terminal Vcom when the switching devices S1 and S2 are in control stopped states, the voltages applied between the drains and the sources of the switching devices S1 and S2 can be equalized by the relay S4 being ON. Therefore, it becomes possible to use semiconductor devices and capacitors with low breakdown voltages, whereby a DC/DC power conversion apparatus having increased efficiency can be provided with low cost.

Embodiment 5

Figure 12:
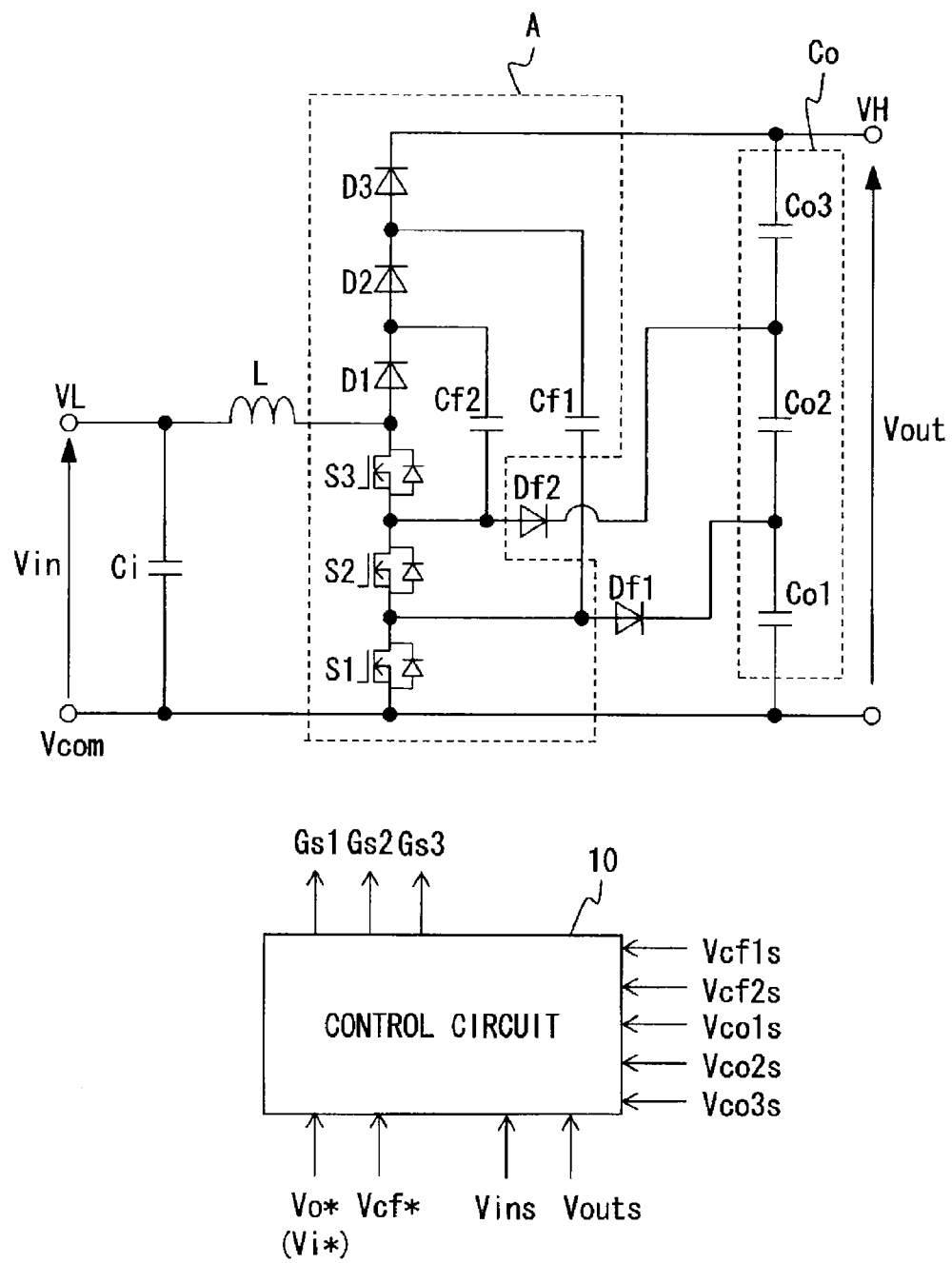
FIG. 12 is a circuit configuration diagram of a DC/DC power conversion apparatus according to embodiment 5 of the present invention.

FIG. 12 is a circuit configuration diagram of a DC/DC power conversion apparatus according to embodiment 5 of the present invention. In FIG. 12, components that correspond to or are the same as those of embodiment 1 shown in FIG. 1 are denoted by the same reference numerals and characters.

The DC/DC power conversion apparatus of embodiment 5 steps up the input voltage Vin inputted between the terminal VL and the terminal Vcom, to a voltage equal to or higher than the input voltage Vin, and outputs the output voltage Vout which is the stepped-up voltage, between the terminal VH and the terminal Vcom. The DC voltage conversion section A of embodiment 5 is composed of three switching devices S1, S2, and S3, three diodes D1, D2, and D3, and two charge-discharge capacitors Cf1 and Cf2. The smoothing capacitor Co on the output side is composed of three voltage division capacitors Co1, Co2, and Co3 sequentially connected in series. Further, the DC voltage conversion section A is provided with diodes Df1 and Df2 as switching devices for voltage equalization.

In the present embodiment, the three switching devices S1, S2, and S3 and the three diodes D1, D2, and D3 are sequentially connected in series. The source terminal of the switching device S1 is connected to the reference voltage terminal Vcom, the cathode terminal of the diode D3 is connected to the output terminal VH, the connection point between the drain terminal of the switching device S3 and the anode terminal of the diode D1 is connected to the input terminal VL via the reactor L. The low-voltage-side terminal of one charge-discharge capacitor Cf1 is connected to the connection point between the drain terminal of the switching device S1 and the source terminal of the switching device S2, and the high-voltage-side terminal is connected to the connection point between the cathode terminal of the diode D2 and the anode terminal of the diode D3. The low-voltage-side terminal of the other charge-discharge capacitor Cf2 is connected to the connection point between the drain terminal of the switching device S2 and the source terminal of the switching device S3, and the high-voltage-side terminal is connected to the connection point between the cathode terminal of the diode D1 and the anode terminal of the diode D2. The low-voltage-side terminal of the voltage division capacitor Co1 is connected to the reference voltage terminal Vcom, and the high-voltage-side terminal of the voltage division capacitor Co3 is connected to the output terminal VH. The anode terminal of one diode Df1 for voltage equalization is connected to the low-voltage-side terminal of the one charge-discharge capacitor Cf1, and the cathode terminal is connected to the connection point between the voltage division capacitors Co1 and Co2. The anode terminal of the other diode Df2 for voltage equalization is connected to the low-voltage-side terminal of the charge-discharge capacitor Cf2, and the cathode terminal is connected to the connection point between the voltage division capacitors Co2 and Co3.

The input voltage detection value Vins, the output voltage detection value Vouts, inter-terminal voltage detection values Vcfs1 and Vcfs2 of the charge-discharge capacitors Cf1 and Cf2, and inter-terminal voltage detection values Vco1s, Vco2s, and Vco1s of the voltage division capacitors Co1, Co2, and Co3, are inputted to the control circuit 10. In addition, as in embodiment 1, from the superior controller (not shown), the output voltage instruction value Vo* or the input voltage instruction value Vi*, and the voltage instruction value Vcf* of the charge-discharge capacitor Cf, are inputted to the control circuit 10. The control circuit 10 outputs gate signals Gs1, Gs2, and Gs3 to the switching devices S1, S2, and S3 of the DC voltage conversion section A, respectively.

The other configuration is the same as that of embodiment 1 shown in FIG. 1.

Next, the operation of the DC/DC power conversion apparatus in the stationary state, particularly, here, the operation in the case where the step-up ratio N is equal to or larger than 3 will be described, as an example.

Figure 13:
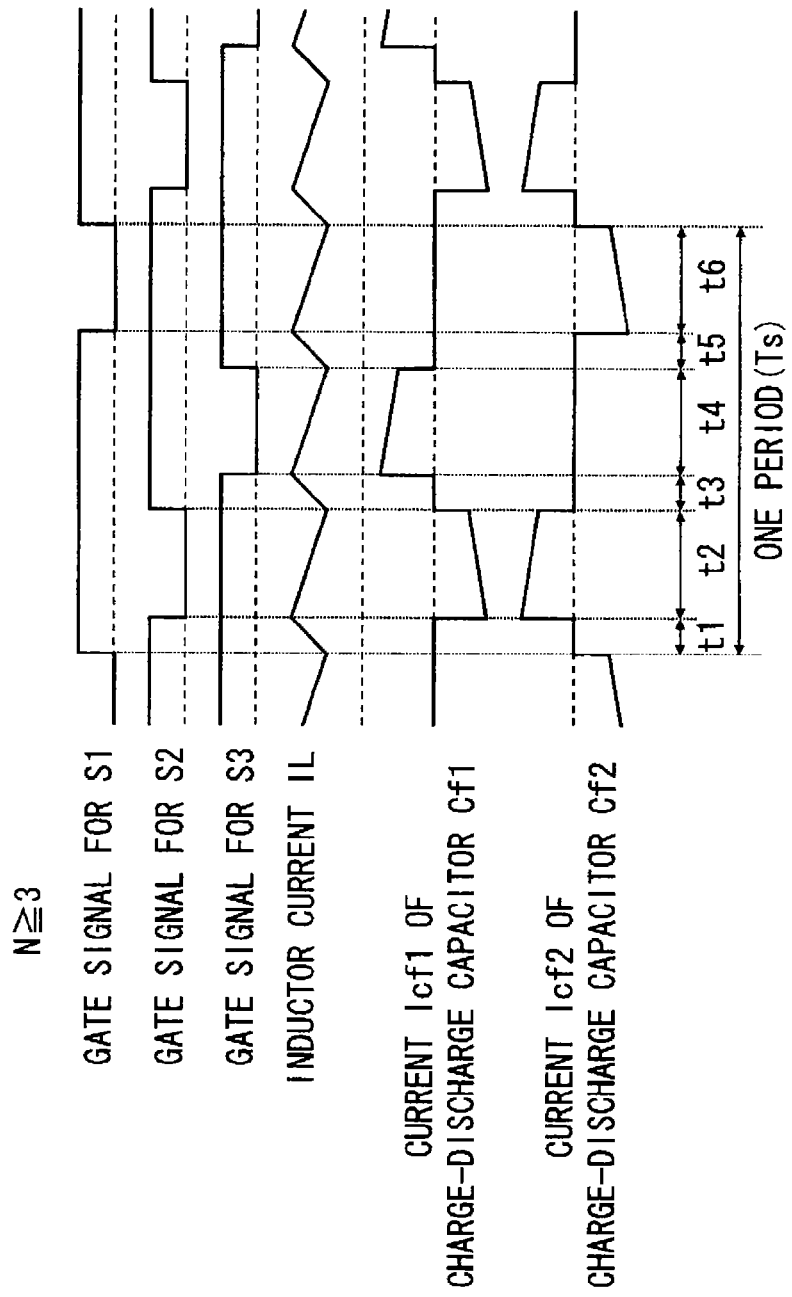
FIG. 13 is an operation explanation diagram of the DC/DC power conversion apparatus shown in FIG. 12.

FIG. 13 shows gate signal voltage waveforms of the switching devices S1, S2, and S3, the current waveform IL of the reactor L, and current waveforms Icf1 and Icf2 of the charge-discharge capacitors Cf1 and Cf2 in the case where the step-up ratio N is equal to or larger than 3.

In the stationary state, the inter-terminal voltage Vcf1 of one charge-discharge capacitor Cf1 is controlled to be about two thirds of the output voltage Vout, and the inter-terminal voltage Vcf2 of the other charge-discharge capacitor Cf2 is controlled to be about one third of the output voltage Vout. The magnitude relationship among the input voltage Vin, the output voltage Vout, and the inter-terminal voltages Vcf1 and Vcf2 of the charge-discharge capacitors is as follows.

$Vout > Vcf1 > Vcf2 > Vin$

In periods t1, t3, and t5 in FIG. 13, since all the switching devices S1, S2, and S3 are ON, energy transfers from the smoothing capacitor Ci on the input side to the reactor L through the following route.

Ci→L→S3→S2→S1

In period t2, since the two switching devices S1 and S3 are ON and the other switching device S2 is OFF, energy stored in the reactor L and the charge-discharge capacitor Cf2 is superimposed onto the smoothing capacitor Ci and transfers to the one charge-discharge capacitor Cf1, through the following route.

Ci→L→S3→Cf2→D2→Cf1→S1

In period t4, since the two switching devices S1 and S2 are ON and the other switching device S3 is OFF, energy transfers from the smoothing capacitor Ci on the input side to the reactor L and the other charge-discharge capacitor Cf2 through the following route.

Ci→L→D1→Cf2→S2→S1

In period t6, since the two switching devices S2 and S3 are ON and the other switching device S1 is OFF, energy stored in the reactor L and the charge-discharge capacitor Cf1 is superimposed onto the smoothing capacitor Ci on the input side and transfers to the voltage division capacitors Co1, Co2, and Co3 on the output side, through the following route.

Ci→L→S3→S2→Cf1→D3→Co3→Co2→Co1

The series of operations described above is repeated, whereby the input voltage Vin inputted between the terminal VL and the terminal Vcom is stepped up to any voltage that is equal to or higher than three times the input voltage Vin, and the stepped-up voltage is outputted as the output voltage Vout between the terminal VH and the terminal Vcom.

Although the operation in the case where the step-up ratio N is equal to or larger than 3 has been described above as an example, the operation in the case where the step-up ratio N is equal to or smaller than 3 is the same as described above except the following operation. That is, in the periods t1, t3, and t5 in FIG. 13, since all the switching devices S1, S2, and S3 are OFF, energy stored in the reactor L is superimposed onto the smoothing capacitor Ci and transfers to the voltage division capacitors Co1, Co2, and Co3, through the following route. Thus, a voltage can be outputted at any step-up ratio N.

Ci→L→D1→D2→D3→Co3→Co2→Co1

Next, the case where the input voltage Vin is applied between the terminal VL and the terminal Vcom when the switching devices S1, S2, and S3 are in control stopped states, will be described. The cause of such a state is as previously described.

In this state, since all the switching devices S1, S2, and S3 are OFF, currents flow through the following four routes, whereby the capacitors Ci, Cf1, Cf2, Co1, Co2, and Co3 are charged.

VL→Ci→Vcom
VL→L→D1→D2→D3→Co3→Co2→Co1→Vcom
VL→L→D1→D2→Df1→Co1→Vcom
VL→L→D1→Cf2→Df2→Co2→Co1→Vcom Thus, the input voltage Vin is applied to the smoothing capacitor Ci on the input side, and also to a series unit composed of the charge-discharge capacitor Cf1 and the voltage division capacitor Co1, and a series unit composed of the charge-discharge capacitor Cf2 and the voltage division capacitors Co2 and Co1.

Here, if Cf1, Cf2<<Co1=Co2=Co3 is assumed, the inter-terminal voltages Vcf1 and Vcf2 of the charge-discharge capacitors Cf1 and Cf2 are represented as follows.

$Vcf1 \approx 2/3 \times Vin$ $Vcf2 \approx 1/3 \times Vin$

A voltage Vds3 applied between the drain and the source of the switching device S3 is equal to the inter-terminal voltage Vcf2 of the charge-discharge capacitor Cf2. Therefore, the voltage Vds3 is one third of the input voltage Vin. The voltage Vds2 applied between the drain and the source of the switching device S2 is equal to the difference between the inter-terminal voltages Vcf1 and Vcf2 of the charge-discharge capacitors Cf1 and Cf2. Therefore, the voltage Vds2 is one third of the input voltage Vin. The voltage Vds1 applied between the drain and the source of the switching device S1 is equal to the difference between the VH-Vcom inter-terminal voltage and the inter-terminal voltage Vcf1 of the charge-discharge capacitor Cf1. Therefore, the voltage Vds3 is one third of the input voltage Vin.

Thus, even if the input voltage Vin is applied between the terminal VL and the terminal Vcom when the switching devices S1, S2, and S3 are in control stopped states, the voltages applied between the drains and the sources of the switching devices S1, S2, and S3 can be equalized. As a result, it becomes possible to use semiconductor devices and capacitors with low breakdown voltages, whereby a DC/DC power conversion apparatus having increased efficiency can be provided with low cost.

In embodiment 5, as in embodiment 2 (FIG. 7), zener diodes may be provided between one diode Df1 for voltage equalization and the connection point between the voltage division capacitors Co1 and Co2, and between the other diode Df2 for voltage equalization and the connection point between the voltage division capacitors Co2 and Co3. Further, current limiting resistors as shown in FIG. 6 may be provided. Thus, reduction of a low-frequency component of the ripple current flowing in the reactor L, and a stable operation of the DC/DC power conversion apparatus can be both realized.

In embodiment 5, as in embodiment 3 (FIG. 9), diodes for returning current may be provided between the positive terminal of the charge-discharge capacitor Cf1 and the connection point between the voltage division capacitors Co2 and Co3, and between the positive terminal of the charge-discharge capacitor Cf2 and the connection point between the voltage division capacitors Co1 and Co2.

Thus, for example, even if the output voltage Vout is increased owing to regenerative power from a load, the voltages applied to the switching devices S1, S2, and S3 and the diodes D1, D2, and D3 of the DC voltage conversion section A can be substantially equalized. Therefore, it becomes possible to use semiconductor devices and capacitors with low breakdown voltages, whereby a DC/DC power conversion apparatus having increased efficiency can be provided with low cost.

In embodiment 5, the three switching devices S1 to S3 connected in series and the three diodes D1 to D3 connected in series are used. However, four such switching devices connected in series and four such diodes connected in series may be used. Also in this case, the same effect can be provided.

Embodiment 6

Figure 14:
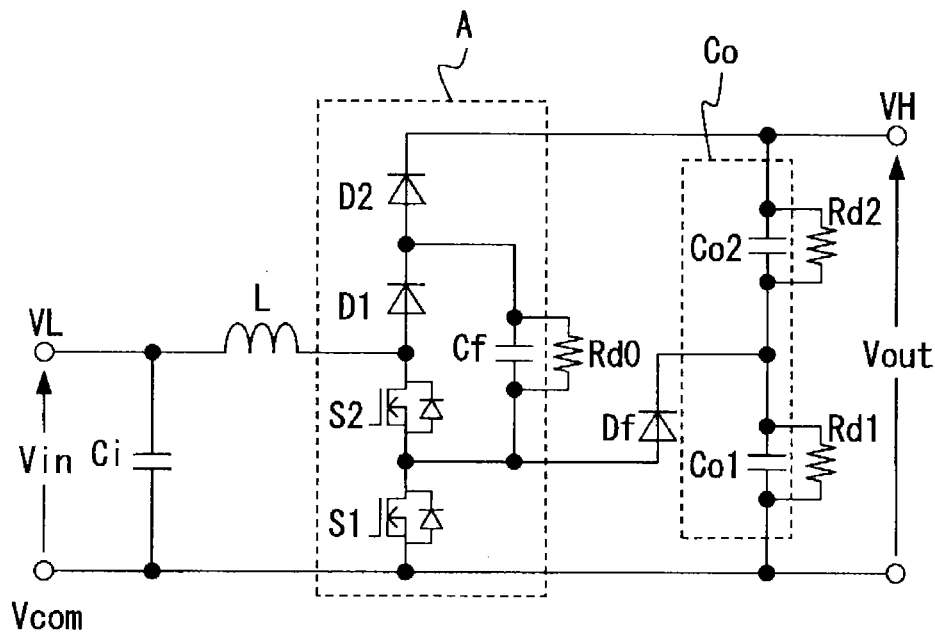
FIG. 14 is a circuit configuration diagram of a DC/DC power conversion apparatus according to embodiment 6 of the present invention.
Figure 14:
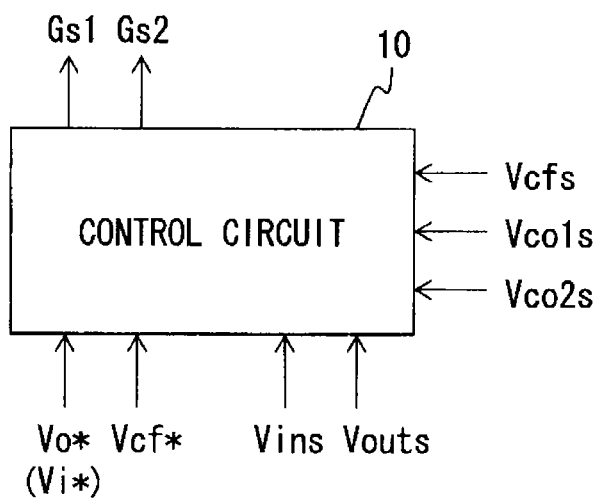

FIG. 14 is a circuit configuration diagram of a DC/DC power conversion apparatus according to embodiment 6 of the present invention. In FIG. 14, components that correspond to or are the same as those of embodiment 1 shown in FIG. 1 are denoted by the same reference numerals and characters.

A feature of the DC/DC power conversion apparatus of embodiment 6 is as follows. Resistors Rd0, Rd1, and Rd2 for discharge are connected in parallel to the charge-discharge capacitor Cf and the voltage division capacitors Co1 and Co2 of the smoothing capacitor Co on the output side, respectively, in the configuration of the DC/DC power conversion apparatus of embodiment 1 (FIG. 1). The other configuration is the same as the circuit configuration shown in FIG. 1.

In the DC/DC power conversion apparatus of embodiment 6, the basic operation in the stationary state and the basic operation when the switching devices S1 and S2 are in control stopped states are the same as in embodiment 1. Here, operations and effects obtained by the addition of the resistors Rd0, Rd1, and Rd2 for discharge will be described.

The semiconductor devices such as the switching devices S1 and S2 and the diodes D1 and D2 described thus far have been assumed as ideal devices. However, a minute leakage current flows in an actual semiconductor device even in an OFF state. For example, in the switching device S1 or S2, even if the gate signal is Low, when a voltage is applied between the drain and the source, a leakage current of about several microamperes to several tens of microamperes flows between the drain and the source. In the case where such a minute leakage current is not negligible, if the input voltage Vin is applied between the terminal VL and the terminal Vcom when the switching devices S1 and S2 are in control stopped states, a minute current corresponding to a leakage current of one switching device S1 flows through the following route.

VL→L→D1→Cf→S1→Vcom

Owing to the minute leakage current, the charge-discharge capacitor Cf is charged and the inter-terminal voltage Vcf increases. As a result, overvoltage can be applied to the other switching device S2 and the diode D1.

At this time, a current also flows through the following route via the charge-discharge capacitor Cf. Therefore, voltage unbalance can occur between the voltage division capacitors Co1 and Co2.

VL→L→D1→Cf→Df→Co1→Vcom

Considering the above, in embodiment 6, the resistor Rd0 for discharge is connected between both terminals of the charge-discharge capacitor Cf. The resistance value of the resistor Rd0 for discharge is set such that a current flowing in the resistor Rd0 is larger than a leakage current flowing in the one switching device S1. Owing to the resistor Rd0 for discharge, in the charge-discharge capacitor Cf, the discharge current becomes larger than the charge current. Therefore, increase in the inter-terminal voltage Vcf of the charge-discharge capacitor Cf is suppressed, and overvoltage can be prevented from being applied to the switching device S2 and the diode D1.

In addition, the resistors Rd1 and Rd2 for discharge are connected between both terminals of the voltage division capacitors Co1 and Co2, respectively, whereby a stable operation can be performed. That is, the resistance values of the resistors Rd1 and Rd2 for discharge are set such that currents flowing in the resistors Rd1 and Rd2 are larger than a current flowing in the resistor Rd0 for discharge. Thus, an influence of a current flowing in the one voltage division capacitor Co1 via the charge-discharge capacitor Cf can be reduced. Therefore, it becomes possible to equalize the inter-terminal voltages of the voltage division capacitors Co1 and Co2.

As described above, according to embodiment 6, the resistor Rd0 for discharge is connected between both terminals of the charge-discharge capacitor Cf. Thus, even in the case where leakage currents in the switching devices are not negligible, the voltages applied between the drains and the sources of the switching devices S1 and S2 can be substantially equalized. Therefore, it becomes possible to use semiconductor devices and capacitors with low breakdown voltages, whereby a DC/DC power conversion apparatus having increased efficiency can be provided with low cost.

In addition, according to embodiment 6, the resistors Rd1 and Rd2 for discharge are connected between both terminals of the voltage division capacitors Co1 and Co2. Thus, when the switching devices S1 and S2 are in control stopped states, even in the case where leakage currents flowing in the switching devices are not negligible, the voltages applied to the switching devices S1 and S2 and the voltage division capacitors Co1 and Co2 can be substantially equalized. Therefore, it becomes possible to use semiconductor devices and capacitors with low breakdown voltages, whereby a DC/DC power conversion apparatus having increased efficiency can be provided with low cost.

In embodiments 1 to 6, the DC/DC power conversion apparatuses that convert a DC voltage to a stepped-up DC voltage have been described. However, the present invention is not limited to such apparatuses of step-up type. For example, the present invention is applicable also to a DC/DC power conversion apparatus of step-down type that converts a DC voltage to a stepped-down DC voltage by using switching devices instead of the diodes D1, D2, and D3.

In embodiments 1 to 6, each diode may be composed of a wide bandgap semiconductor having a wider bandgap than silicon. Examples of wide bandgap semiconductors include materials such as silicon carbide and gallium-nitride-based materials, and diamond. Conduction loss of diodes can be reduced by using diodes composed of wide bandgap semiconductors. In addition, since occurrence of a reverse recovery current can be suppressed, loss due to the reverse recovery current can be reduced. Therefore, the power conversion efficiency of a power conversion apparatus can be increased, and unnecessary heat generation can be reduced. Therefore, it becomes possible to reduce the size of a radiation fin of a heat sink and reduce the size of a semiconductor module. Moreover, since only diodes are composed of wide bandgap semiconductors, increase in the fabrication cost of the DC/DC power conversion apparatus can be reduced.

In embodiments 1 to 6, each switching device may be composed of a wide bandgap semiconductor having a wider bandgap than silicon. Examples of wide bandgap semiconductors include materials such as silicon carbide and gallium-nitride-based materials, and diamond. A switching device composed of a wide bandgap semiconductor can be used in a high-voltage region in which it is difficult for a silicon semiconductor to perform unipolar operation, and switching loss of the switching device upon its switching operation can be greatly reduced. Therefore, it becomes possible to greatly reduce power loss. In addition, since power loss is small and the heat resistance is high, the size of a radiation fin of a heat sink can be reduced and a water-cooling unit can be changed to an air-cooling type. Therefore, it becomes possible to further reduce the size of the semiconductor module. In addition, since a high-frequency switching operation can be performed, a DC/DC converter becomes able to operate at a high carrier frequency. Therefore, the sizes of a reactor, a capacitor, and the like connected to a DC/DC converter can be reduced.

The invention claimed is:

1. A DC/DC power conversion apparatus, comprising:
   a reactor connected to a DC power supply;
   a DC voltage conversion section connected to the reactor, the DC voltage conversion section including
      a plurality of switching devices,
      a charge-discharge capacitor which is charged or discharged by ON/OFF operations of the switching devices, and
      a plurality of diodes which provide a charging route and a discharging route for the charge-discharge capacitor;
   a smoothing capacitor on an output side, which is connected to the DC voltage conversion section and includes a plurality of voltage division capacitors connected in series to each other; and
   a switching device for voltage equalization provided on a connection line provided between the negative terminal of the charge-discharge capacitor and a connection point between the voltage division capacitors.

2. The DC/DC power conversion apparatus according to claim 1, wherein
   a current limiting resistor is connected in series to the switching device for voltage equalization.

3. The DC/DC power conversion apparatus according to claim 1, wherein
   a zener diode is connected in reverse series to the switching device for voltage equalization.

4. The DC/DC power conversion apparatus according to claim 1, wherein
   the switching device for voltage equalization is a diode, or a switch of normally-on type which is turned on when all the switching devices of the DC voltage conversion section are in control stopped states.

5. The DC/DC power conversion apparatus according to claim 1, wherein
   the inter-terminal voltage of the charge-discharge capacitor is controlled to be higher than a voltage between the high-voltage-side terminal of the voltage division capacitor of the smoothing capacitor on the output side, and the connection point between the voltage division capacitor and the next voltage division capacitor.

6. The DC/DC power conversion apparatus according to claim 1, wherein
a diode for returning current is connected between the positive terminal of the charge-discharge capacitor and a connection point between the voltage division capacitors.

7. The DC/DC power conversion apparatus according to claim 6, wherein
a current limiting resistor is connected in series to the diode for returning current.

8. The DC/DC power conversion apparatus according to claim 1, wherein
a discharge resistor for discharging electric charge stored in the charge-discharge capacitor is provided between the positive terminal and the negative terminal of the charge-discharge capacitor.

9. The DC/DC power conversion apparatus according to claim 8, wherein
the resistance value of the discharge resistor is set such that a current flowing in the discharge resistor is larger than a leakage current in the switching devices.

10. The DC/DC power conversion apparatus according to claim 1, wherein
at least one of the plurality of diodes and the plurality of switching devices include wide bandgap semiconductors.

11. A DC/DC power conversion apparatus, comprising:
a smoothing capacitor on an input side, which is connected in parallel to a DC power supply and smoothes a DC voltage, the smoothing capacitor including a plurality of voltage division capacitors connected in series to each other;
a reactor connected to the DC power supply;
a DC voltage conversion section connected to the reactor and including
a plurality of switching devices,
a charge-discharge capacitor which is charged or discharged by ON/OFF operations of the switching devices, and
a plurality of diodes which provide a charging route and a discharging route for the charge-discharge capacitor;
a smoothing capacitor on an output side, which is connected to the DC voltage conversion section; and
a switching device for voltage equalization provided on a connection line provided between the negative terminal of the charge-discharge capacitor and a connection point between the voltage division capacitors of the smoothing capacitor on the input side.

12. The DC/DC power conversion apparatus according to claim 11, wherein
the switching device for voltage equalization is a switch of normally-on type which is turned on when all the switching devices of the DC voltage conversion section are in control stopped states.

13. The DC/DC power conversion apparatus according to claim 12, wherein
a discharge resistor for discharging electric charge stored in the charge-discharge capacitor is provided between the positive terminal and the negative terminal of the charge-discharge capacitor.

14. The DC/DC power conversion apparatus according to claim 13, wherein
the resistance value of the discharge resistor is set such that a current flowing in the discharge resistor is larger than a leakage current in the switching devices.

15. The DC/DC power conversion apparatus according to claim 12, wherein
at least one of the plurality of diodes and the plurality of switching devices include wide bandgap semiconductors.

* * * * *